United States Patent [19]

Essex et al.

[11] Patent Number: 5,394,947
[45] Date of Patent: Mar. 7, 1995

[54] TUBULAR HITCH MEMBER BALL CONNECTION FOR AN IMPLEMENT

[75] Inventors: Duane A. Essex, Des Moines; Terry L. Lowe, Ankeny, both of Iowa

[73] Assignee: Deere & Company, Moline, Ill.

[21] Appl. No.: 229,068

[22] Filed: Apr. 18, 1994

Related U.S. Application Data

[63] Continuation of Ser. No. 930,883, Aug. 14, 1992, abandoned.

[51] Int. Cl.⁶ .................... A01B 63/00; B21D 11/14
[52] U.S. Cl. .................... 172/439; 172/677; 72/367
[58] Field of Search .......... 172/677, 439, 684; 280/491.3, 491.5, 493, 495; 72/367; 29/441.1, 442, 437

[56] References Cited

U.S. PATENT DOCUMENTS

| | | | |
|---|---|---|---|
| 2,144,806 | 1/1939 | Meager et al. | 280/294 |
| 3,104,464 | 9/1963 | Frink | 72/367 |
| 3,378,279 | 4/1968 | Jacobs | 172/677 |
| 3,454,285 | 7/1969 | Van Peursem | 172/677 |
| 3,627,352 | 12/1971 | Canole | 280/491.3 |
| 4,768,803 | 9/1988 | Hewitt et al. | 280/494 |
| 5,070,717 | 12/1991 | Boyd et al. | 72/367 |

*Primary Examiner*—Clifford D. Crowder
*Assistant Examiner*—Bibhu Mohanty

[57] ABSTRACT

Hitch ball assemblies for implement hitches are welded directly into holes formed in sidewalls of tubing ends which have been flattened to provide direct load transfer from the tubing to the implement frame. Several different flattened end cross-sectional configurations provide strong ball joint areas with a pleasing appearance. In one embodiment, an additional plate is supported between the sidewalls prior to flattening, and the hole is formed in the two sidewalls and the plate in the same hole-forming operation. The reduced number of hitch parts and welding steps decreases cost and dimensional variations.

12 Claims, 3 Drawing Sheets

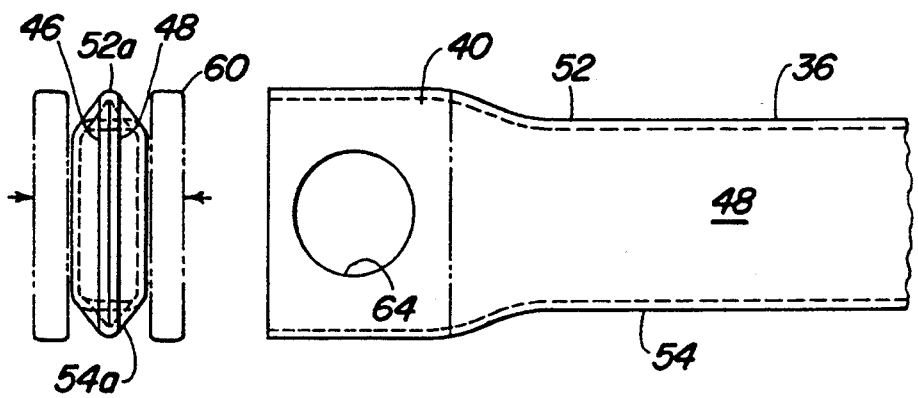
FIG. 4
FIG. 4a
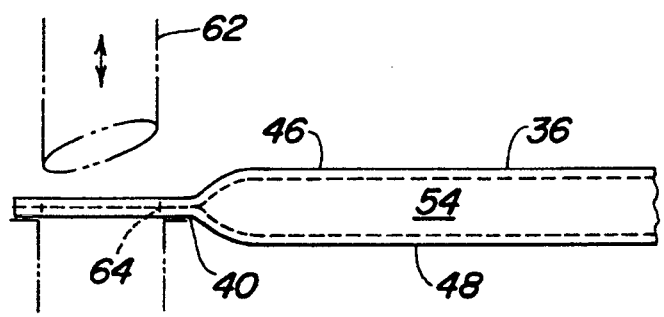
FIG. 5
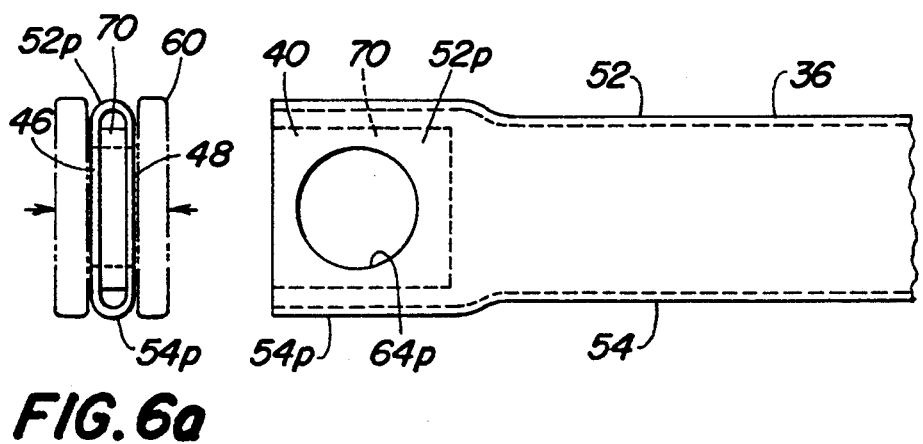
FIG. 6
FIG. 6a
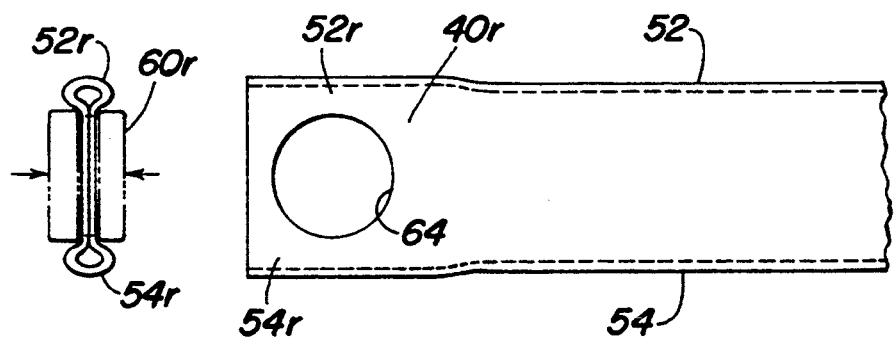
FIG. 7
FIG. 7a

TUBULAR HITCH MEMBER BALL CONNECTION FOR AN IMPLEMENT

This application is a continuation of application Ser. No. 07/930,883, filed 14 Aug. 1992, now abandoned.

BACKGROUND OF THE INVENTION

1. Field of the Invention

The present invention relates generally to towed agricultural implements and, more specifically, to an implement hitch with a load-carrying ball for accommodating hitch angle changes.

2. Related Art

Draft hitches on framed implements such as tillage machines typically include tubular beams with load-bearing balls at the point where the beams attach to the frame. The balls allow relative angular motion between the hitch and the frame as the implement is towed.

Previously available hitches (see FIG. 1 of the drawings) included a ball assembly 10 supported by and welded to a pair of straps 12. The straps with the ball assembly attached were then welded to the outside walls of a tubular beam 16. A bolt 18 connects the ball assembly 10 to a bracket 20 fixed to the implement frame.

Numerous parts, some of which are relatively difficult to fabricate, and several welding steps are required, increasing the manufacturing costs of the hitch connection and impacting negatively on the overall appearance of the hitch. Dimensional integrity is difficult to maintain with welded straps. Loads are transferred via the straps rather than directly into the draft member.

BRIEF SUMMARY OF THE INVENTION

It is therefore an object of the invention to provide an improved implement hitch structure and method of manufacture which overcomes most or all of the aforementioned problems of conventional hitch structures. It is yet another object to provide such a method and structure which reduces parts and manufacturing costs.

It is still a further object to provide an improved implement hitch structure and method of manufacture which eliminates the need for welded strap ball connections and which results in better strength, appearance and dimensional integrity of the hitch structure. It is a further object to provide such a structure and method which requires less parts and is less expensive than most previously available hitch manufacturing methods.

Hitch ball assemblies are welded directly into holes formed in sidewalls of tubing ends which have been flattened. The holes are punched in the adjacent sidewalls of the flattened end. Several different flattened end cross-sectional configurations each provide a strong ball joint area. In one embodiment, the top and bottom walls are formed into reinforcing structure having generally rounded cross-sections above and below the flattened area. In another embodiment, an additional plate is supported between the sidewalls prior to flattening and the hole is formed in the two sidewalls and the plate in the same hole-forming operation. The plate adds extra strength to the ball connection area.

Smoother, more efficient load transfer results from welding the ball assemblies directly to the draft member. There are fewer hitch parts and welding steps, and dimensional integrity is easier to maintain than with most previously available hitch fabrication methods. A more pleasing appearance is provided by integrating the ball support directly into the tubing end, and hitch costs are very substantially reduced over previously available hitch structure and fabrication methods.

These and other objects, features and advantages of the present invention will become apparent to one skilled in the art upon reading the following detailed description in view of the drawings.

BRIEF DESCRIPTION OF THE DRAWINGS

FIG. 4 is an enlarged side view of one of the tube ends on the hitch of FIGS. 2 and 3.

FIG. 4a is an end view of taken along lines 4a—4a of FIG. 4.

FIG. 5 is a top view of the tube end of FIG. 4.

FIG. 6 is a side view of a hitch tube with an additional reinforcement plate.

FIG. 6a is an end view of the tube of FIG. 6.

FIG. 7 is a side view of a hitch tube with rounded upper and lower reinforcing areas adjacent the flattened area.

FIG. 7a is an end view of the tube of FIG. 7.

DETAILED DESCRIPTION OF THE DRAWINGS

Figure 1:
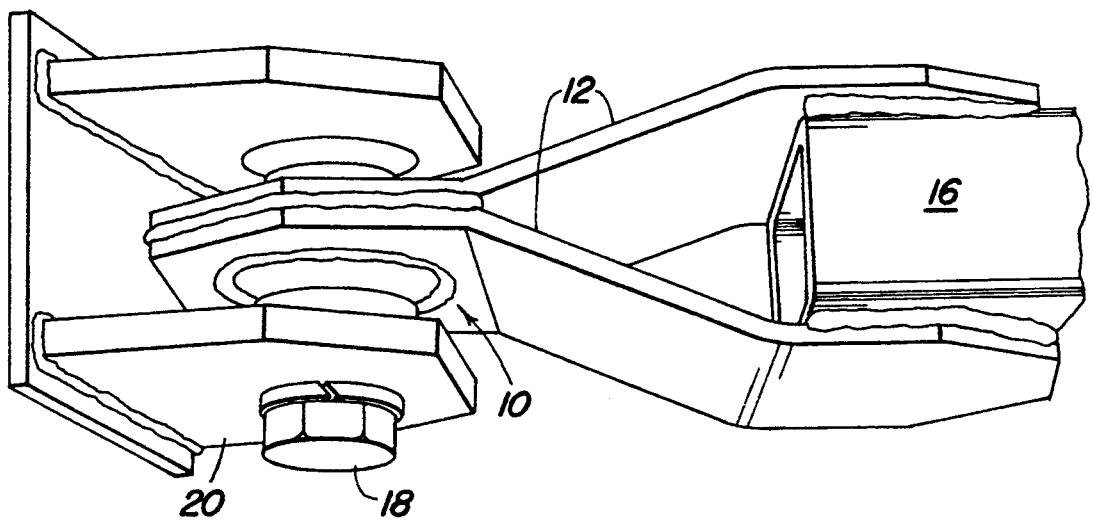
FIG. 1 is a perspective view of a ball connection assembly typical of the prior art.
Figure 2:
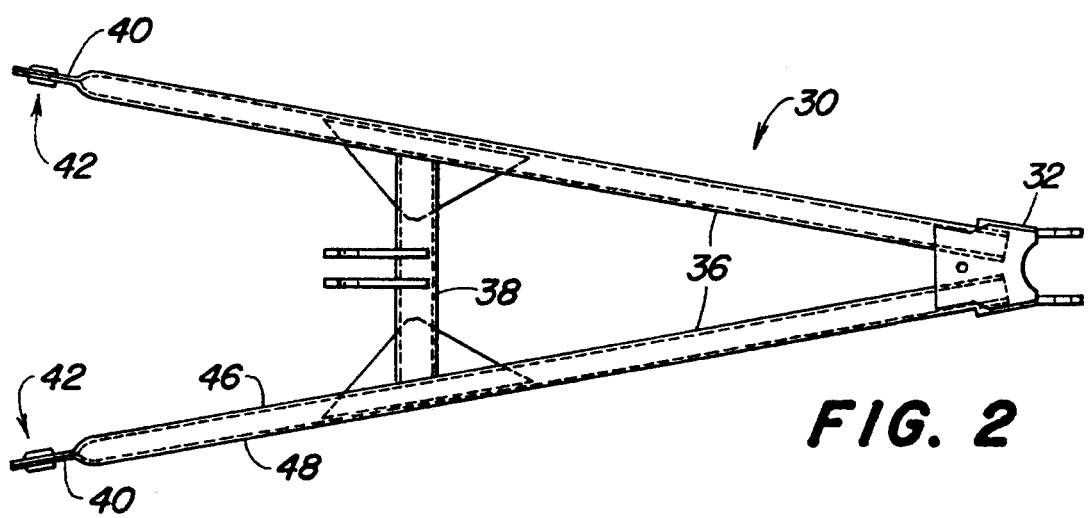
FIG. 2 is a top view of an implement hitch with the improved ball connection of the present invention.
Figure 3:
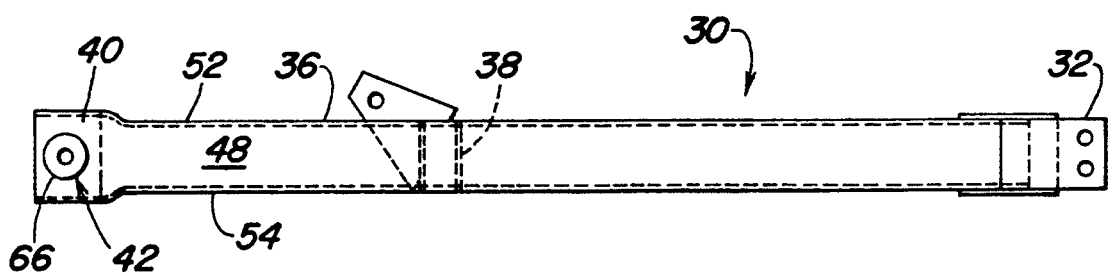
FIG. 3 is a side view of the hitch of FIG. 2.

Referring now to FIGS. 2 and 3, therein is shown an implement hitch 30 having a forward towing connection 32 and a pair of diverging tubes or beams 36 extending rearwardly from the connection 32. A centrally located cross support member 38 is connected between the beams 36. The aft ends of the tubes 36 are flattened (FIG. 4a) at 40 and support ball connection assemblies 42.

The tubes 36 are rectangular in cross section and include sidewalls 46 and 48 joined by top and bottom walls 52 and 54. The aft ends are moved into a press station and flattened by a die 60 (shown in the open position in FIG. 4a) so the walls 52 and 54 deform outwardly (52a and 54a) and the sidewalls 46 and 48 touch or are in close proximity to each other and form a flat, generally rectangular ball-receiving area having length and height substantially greater than the diameter of the ball connection assembly 42. The flattened area 40 is supported (FIG. 5) at a punching station where a punch 62 forms a precisely located ball-receiving hole 64 through both sidewalls 46 and 48 in a single operation. The assembly 42 (FIG. 3) is then placed in the hole 64 and welded at 66 to both sidewalls 46 and 48 in the flattened area 40 to form a strong ball connection zone.

In the embodiment shown in FIGS. 6 and 6a, prior to the pressing step, a reinforcing plate 70 having a height approximately equal to but slightly less than the inside distance between the top and bottom walls 52 and 54 is supported between the sidewalls 46 and 48. As the sidewalls 46 and 48 are pressed towards each other and the walls 52 and 54 deform outwardly (52p and 54p), the plate 70 is sandwiched between the sidewalls. The flatten area 40p is then supported at the punch station and a hole 64p is punched through both sidewalls 46 and 48 and the plate 70 in a single operation. The ball assembly 42 is then welded to the sidewalls 46 and 48.

In the embodiment shown in FIGS. 7 and 7a, the top and bottom walls 52 and 54 are deformed into rounded cross-sectional configuration (52r and 54r) as the end is flattened (40r) to form opposed rounded reinforcing structure above and below the end portions of the sidewalls. The area of the press 60r is sufficiently small (FIG. 7a) to permit the walls to flow into the smooth, rounded configuration during the pressing step to give the end a strong, I-beam type configuration with a pleasing look.

Figure 8:
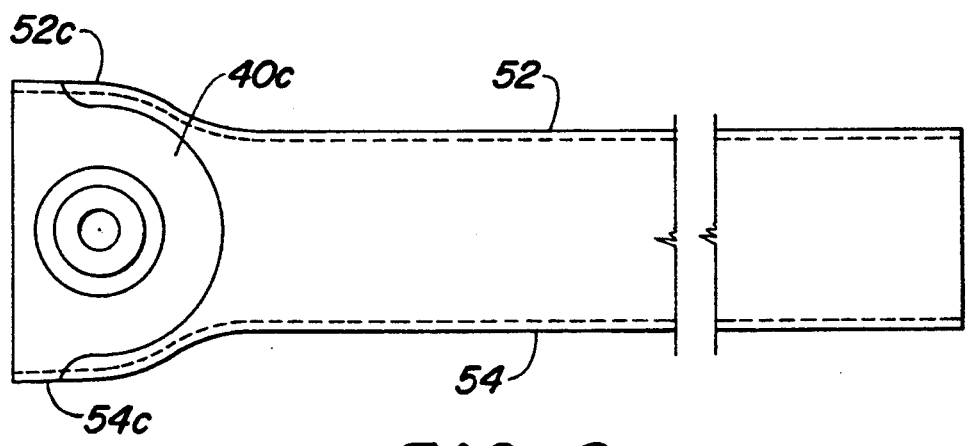
FIG. 8 is a view similar to FIG. 4 of an alternate embodiment of the tube end.
Figure 9:
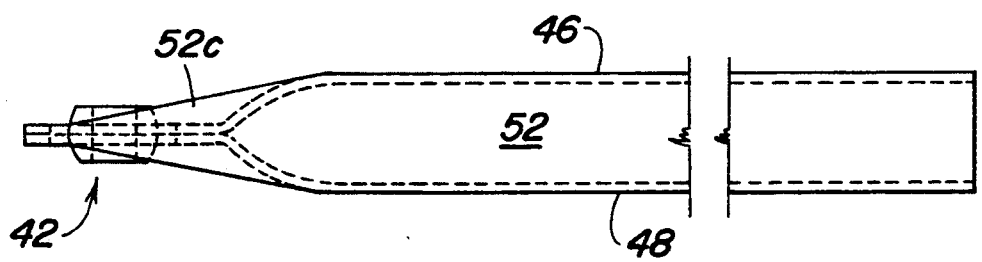
FIG. 9 is a top view of the tube of FIG. 8.

In the embodiment shown in FIGS. 8 and 9, the flattened area 40c is formed using a circular die and is generally semicircular in configuration inwardly from the end of the tube with the arc or curve of the flattened portion opening outwardly (that is, to the left as viewed in FIG. 8). The resulting flat portion includes a semicircular boundary lying on the arc of a circle. The hole for the ball assembly 42 is punched so that its center and the center of the arc generally coincide. As best seen in FIG. 9, the top and bottom walls 52c and 54c taper inwardly or converge toward the completely flattened end to form a reinforced area above and below the ball assembly 42 for a strong connecting area having a pleasing appearance. Use of the round die to produce the arc-shaped boundary of FIG. 8 is preferred.

Having described the preferred embodiment, it will become apparent that various modifications can be made without departing from the scope of the invention as defined in the accompanying claims. For example, references to the top and bottom walls are given only for ease in describing the relative orientations of the structure and method, and it is to be understood that other orientations may be used.

We claim:

1. A method of fabricating an agricultural hitch structure for a framed implement comprising the steps of:
   a. providing a tubular hitch member of rectangular cross section having an end with top and bottom walls and sidewalls;
   b. flattening the tubular hitch member end, the step of flattening including deforming the top and bottom walls so that end portions of the sidewalls lie in close proximity to each other and diverge from the flattened end to the rectangular cross section adjacent the flattened end, the step of flattening the tubular hitch member end including forming a flattened area opening outwardly toward the end, the step of deforming the top and bottom walls including forming reinforcing areas having cross-sectional portions wider than the flattened area and extending outwardly to the end on opposite sides of the flattened area to define with the flattened area an I-beam type configuration;
   c. forming a hole in the end portions of the sidewalls generally between the reinforcing areas;
   d. inserting a hitch ball assembly in the hole; and,
   e. fixing the hitch ball assembly to the sidewalls of the flattened end.

2. The method as set forth in claim 1 wherein the step of deforming the top and bottom walls includes bending the top and bottom sidewalls away from each other as the sidewalls move towards each other.

3. The method as set forth in claim 1 wherein the step of deforming the top and bottom walls includes bending the top and bottom walls into a rounded cross-sectional configuration as the end is flattened to form opposed rounded reinforcing structure above and below the end portions of the sidewalls.

4. The method as set forth in claim 3 wherein the step of forming a hole includes punching a hole in the sidewalls between the rounded reinforcing structure.

5. A method of fabricating an agricultural hitch structure for a framed implement comprising the steps of:
   providing a tubular hitch member of rectangular cross section having an end with top and bottom walls and sidewalls;
   flattening the tubular hitch member end, the step of flattening including deforming the top and bottom walls so that end portions of the sidewalls lie in close proximity to each other and diverge from the flattened end to the rectangular cross section adjacent the flattened end, the step of deforming including providing an I-beam type of configuration by pressing the sidewalls together to form a generally rounded configuration on opposite sides of the close proximity sidewalls;
   forming a hole in the end portions of the sidewalls;
   inserting a hitch ball assembly in the hole; and
   fixing the hitch ball assembly to the sidewalls of the flattened end.

6. An agricultural hitch structure for a framed implement comprising:
   a tubular hitch member of rectangular configuration with top and bottom walls and sidewalls, the hitch member including an end;
   wherein the top and bottom walls of the end are deformed so that end portions of the sidewalls lie in close proximity to each other to define a generally flattened area inwardly from and parallel to the sidewalls adjacent the end;
   wherein a hole is formed in the end portions of the sidewalls;
   a hitch ball assembly supported in the hole and fixed to the sidewalls of the flattened area, and
   wherein the top and bottom walls of the end are formed into reinforcing members having rounded cross-sectional portions above and below the sidewalls to thereby define a strengthened I-beam structure on opposite sides of the hitch ball assembly.

7. The invention as set forth in claim 6 wherein the top and bottom walls are bent away from each other.

8. The invention as set forth in claim 6 wherein the hole is located between the rounded cross-sectional portions.

9. The invention as set forth in claim 6 including a reinforcing plate sandwiched between the sidewalls and including an aperture in the plate, wherein the hitch ball assembly is also supported in the plate aperture.

10. The invention as set forth in claim 6 wherein the top and bottom walls of the end converge toward the end and wherein the flattened area includes an inward portion opposite the end of the tube, the inward portion being curved with the curve opening outwardly toward the end.

11. The invention as set forth in claim 10 wherein the flat portion is generally semicircular in configuration.

12. The invention as set forth in claim 10 wherein the flat portion includes a boundary lying on the arc of a circle centered approximately at the center of the hole.

* * * * *